United States Patent [19]
Doi et al.

[11] Patent Number: 5,305,084
[45] Date of Patent: Apr. 19, 1994

[54] HETERODYNE INTERFEROMETER

[75] Inventors: Hiroshi Doi; Mitsuhito Kamei, both of Hyogo, Japan

[73] Assignee: Mitsubishi Denki Kabushiki Kaisha, Tokyo, Japan

[21] Appl. No.: 935,969

[22] Filed: Aug. 27, 1992

[30] Foreign Application Priority Data

Sep. 2, 1991 [JP] Japan ................................. 3-221378

[51] Int. Cl.[5] .............................................. G01B 9/02
[52] U.S. Cl. .................................... 356/349; 356/28.5
[58] Field of Search ...................... 356/28.5, 345, 349, 356/357, 358

[56] References Cited

U.S. PATENT DOCUMENTS

| 4,715,706 | 12/1987 | Wang | 356/28.5 |
| 5,026,162 | 6/1991 | Langdon | 356/354 |
| 5,159,406 | 10/1992 | Adler et al. | 356/349 |

OTHER PUBLICATIONS

P. Buchhave, "Laser Doppler Velocimeter with Variable Optical Frequency Shift", *Optics and Laser Technology*, vol. 7, No. 1, Feb. 1975, pp. 1-16.

*Primary Examiner*—F. L. Evans
*Attorney, Agent, or Firm*—Burns, Doane, Swecker & Mathis

[57] ABSTRACT

According to the present invention, there is provided a heterodyne interferometer comprising a laser oscilator, a frequency modulator which splits the laser beam into two beams and causes the beams to have different frequencies, a photodetector which composes both beams after at least one beam is reflected or transmitted by an object under test, and produces an interference signal from a composed laser beam, a frequency analyzer which reveals a Doppler frequency component of the interference signal, and an x-axis and y-axis fine movement command circuit and a photodetector positioning mechanism which detects the amplitude of the a.c.(alternating current) component of the interference signal and positions the photodetector so that the amplitude is maximum. The present invention also provides the heterodyne interferometer which, instead of the x-axis and y-axis fine movement command circuit and a photodetector positioning mechanism, comprises a plurality of photodetector disposed in the direction perpendicular to the laser beam axis, a peak value discriminator which discriminates a peak amplitude of the interference signals output by the photodetectors, and a multiplexer which discriminates interference signal having the largest amplitude and transmits this interference to the frequency analyzer. The heterodyne interferometer is capable of obtaining interference signal of a predetermined level irrespective of the surface condition of an object under test at the laser beam focal point.

8 Claims, 6 Drawing Sheets

HETERODYNE INTERFEROMETER

BACKGROUND OF THE INVENTION

1. Field of the Invention

The present invention relates to a heterodyne interferometer capable of measuring the velocity or vibration of an object under test accurately in a non-contact manner by utilizing the interference of light.

2. Description of the Prior Art

Figure 7:
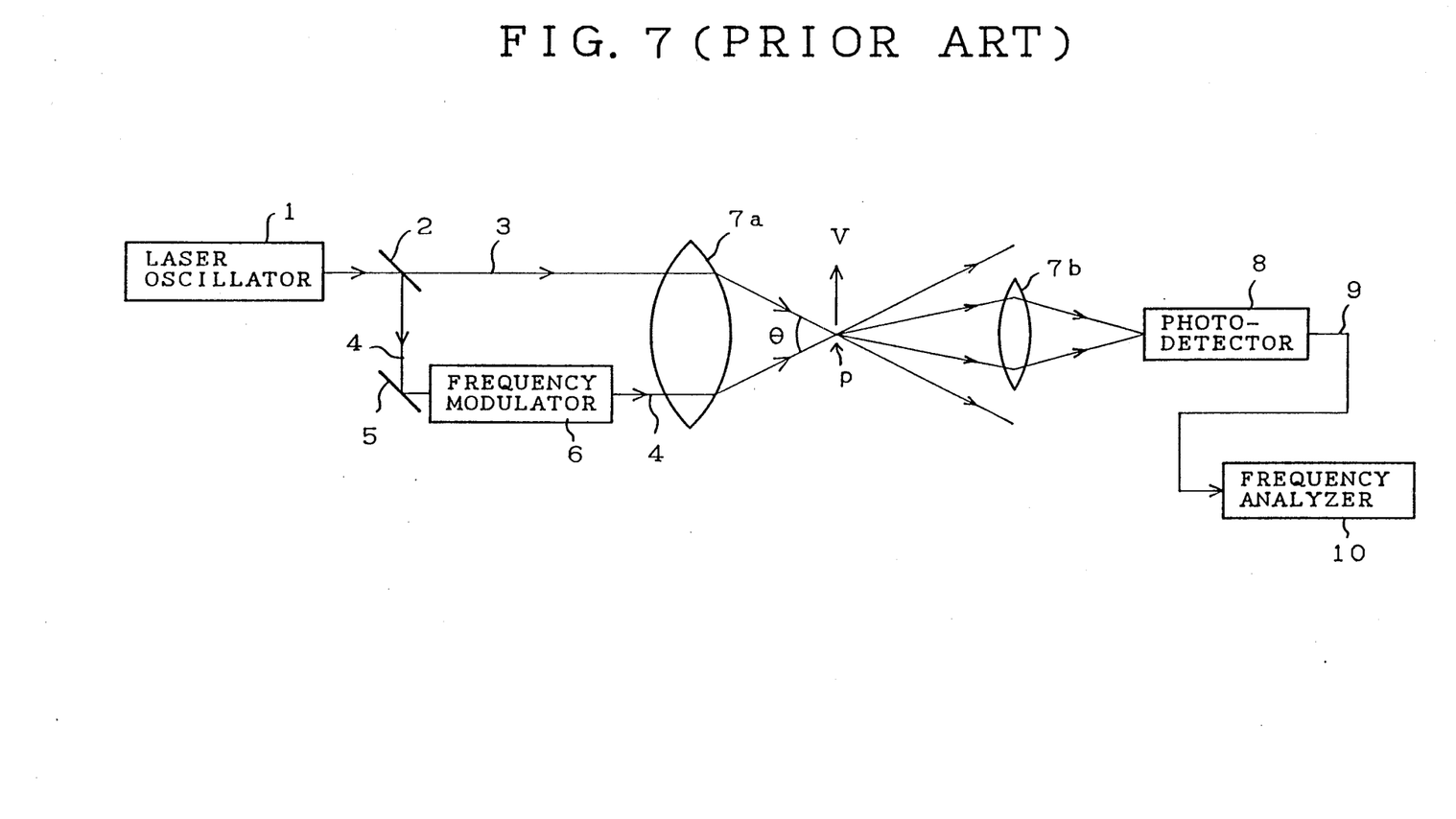
FIG. 7 is a block diagram of the conventional heterodyne interferometer.

FIG. 7 shows the arrangement of a conventional heterodyne interferometer disclosed in publication "Optics and Laser Technology", Vol. 7, No. 1, pp. 11-16, by P. Buchhave, published in 1975 by IPC Science and Technology Press. In the figure, symbol 1 denotes a laser oscillator, 2 is a beam splitter, 3 is a frequency non-modulated beam, 4 is a frequency modulated beam, 5 is a mirror, 6 is a frequency modulator, 7a and 7b are converging lenses, 8 is a photodetector, 9 is an interference signal, and 10 is a frequency analyzer.

This heterodyne interferometer operates as follows. A laser beam produced by the laser oscillator 1 is split into two beams by means of the beam splitter 2. One beam as a frequency non-modulated beam 3 reaches the converging lens 7a without any rendition of frequency modulation, and another, beam as a frequency modulated beam 4 is reflected by the mirror 5 and is incident to the frequency modulator 6, where the beam is subjected to a small frequency modulation (with a frequency shift of $f_o$) and the resulting beam reaches the converging lens 7a. Both beams 3 and 4 are focused by the converging lens 7a to a point P in a fluid including very small particles and moving at velocity V in the direction perpendicular to the optical axis (shown by the arrow in the figure). The beams 3 and 4 are reflected by particles and subjected to the Doppler shift depending on their frequencies.

In case the object under test is a transparent fluid, the beams 3 and 4 after the focal point P are collected by the converging lens 7b and are incident to the photodetector 8. The photodetector 8 integrates the amount of light received on its entire light-sensitive plane thereby to produce an interference signal 9 for the two beams 3 and 4. The interference signal 9 has a Doppler frequency $f_d$ expressed as follows.

$$f_d = |F_o - (2V/\lambda) \sin(\theta/2)| \quad (1)$$

where $\lambda$ is the wavelength of the laser beam emitted by the laser oscillator 1, and $\theta$ is the angle of intersection of the non-modulated beam 3 and modulated beam 4. Accordingly, the frequency analyzer 10 evaluates the velocity V of the object under test from the Doppler frequency $f_d$ of the interference signal 9 through the calculation of the above expression (1).

However, in the foregoing conventional heterodyne interferometer, the amount of light incident to the photodetector 8 varies due to the of the surface of particles included by the fluid at the moving focal point P of the laser beams, or in the multi-point measurement based on the scanning of the laser beams, and consequently the resulting interference signal fluctuates. In some cases, the level of the interference signal becomes too low to ensure the accuracy of measurement of the moving velocity of the object under test.

SUMMARY OF THE INVENTION

The present invention is intended to deal with the foregoing situation, and its prime object is to provide a heterodyne interferometer capable of producing an interference signal with a predetermined level irrespective of the surface condition of the object under test at the laser beam focal point so that the moving velocity or vibration velocity of the object can be measured accurately.

In order to achieve the above objective, the heterodyne interferometer based on a first aspect of this invention comprises a laser oscillation means for producing a laser beam, a frequency modulation means which splits the laser beam into two beams and causes the beams to have different frequencies, a heterodyne detection means which conducts the two laser beams so that at least one beam is reflected or transmitted by an object under test, and thereafter composes both beams and produces an interference signal from the composed laser beam by means of a photodetector included in it, a frequency analysis means which reveals the Doppler frequency component of the interference signal, and a photodetector positioning means which detects the amplitude of the a.c. component of the interference signal and positions the photodetector so that the amplitude is maximum.

The heterodyne interferometer based on a second aspect of this invention comprises a laser oscillation means for producing a laser beam, a frequency modulation means which splits the laser beam into two beams and causes the beams to have different frequencies, a heterodyne detection means which conducts the two laser beams so that at least one beam is reflected or transmitted by an object under test, and thereafter composes both beams and produces interference signals from the composed laser beam by means of a plurality of photodetectors included in it and disposed in the direction perpendicular to the laser beam axis, and selects the photodector ourputting an interference signal having the largest amplitude of a.c. component among the signals provided by the photodetectors, and a frequency analysis means which reveals the Doppler frequency component of the interference signal.

The heterodyne interferometer based on the first aspect of this invention operates to detect the amplitude of a.c. component of the interference signal produced by the photodetector in the heterodyne detection means and position the photodetector so that the amplitude is maximum, whereby an interference signal (measured signal) of a predetermined level can be obtained irrespective of the surface condition of the object under test at the laser beam focal point.

The heterodyne interferometer based on the second aspect of this invention has its heterodyne detection means including a plurality of photodetectors disposed at different positions and selecting an interference signal having the largest a.c. amplitude among the signals produced by the photodetectors, whereby an interference signal which best fits for the measurement can be obtained irrespective of the surface condition of the object under test at the laser beam focal point.

DESCRIPTION OF THE PREFERRED EMBODIMENTS

Embodiments this invention will be explained with reference to FIG. 1 through FIG. 6.

Embodiment 1

Figure 1:
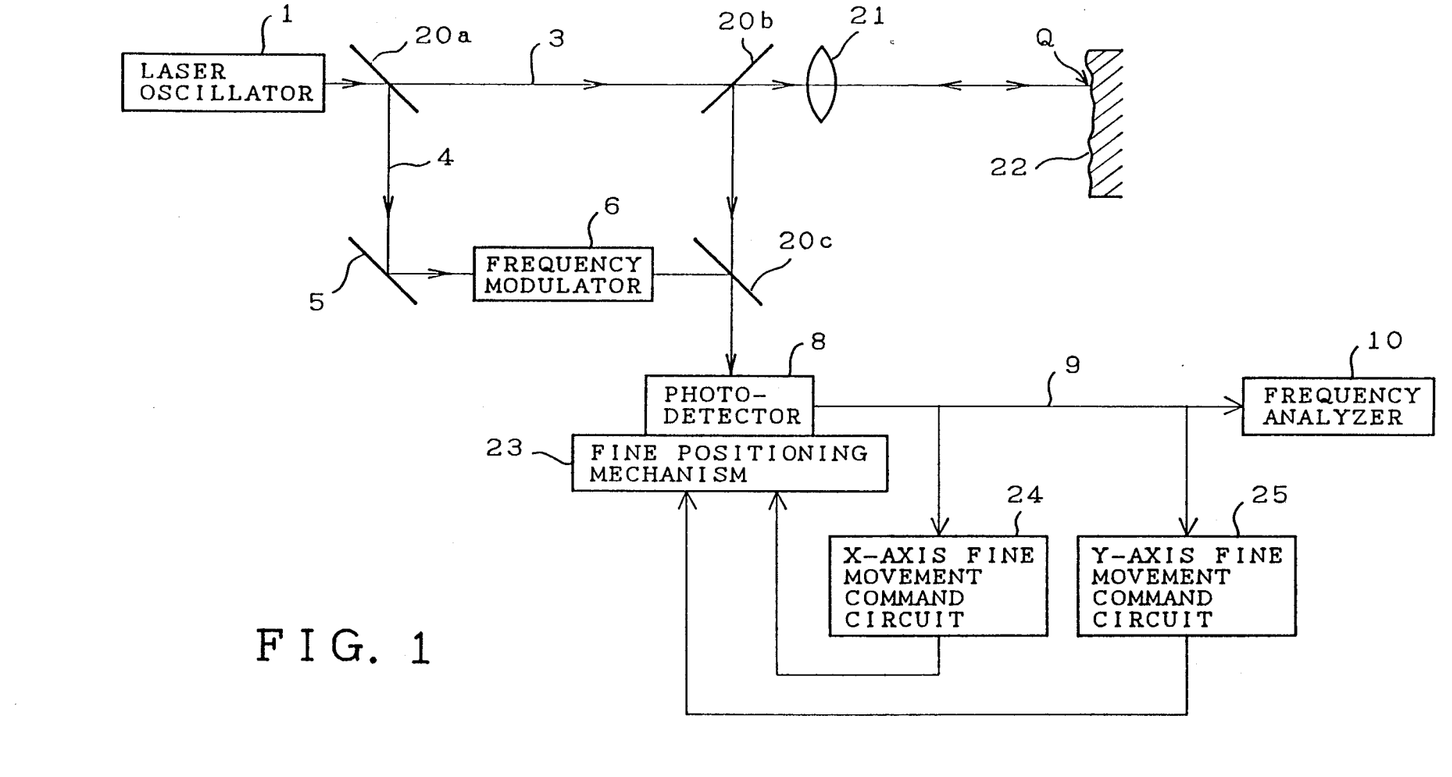
FIG. 1 is a block diagram of the heterodyne interferometer based on an embodiment of this invention.

FIG. 1 is a block diagram of the heterodyne interferometer based on the first embodiment of this invention. In the figure, items referred to by symbols 1, 3-6, and 8-10 are identical to those of the conventional arrangement shown in FIG. 7 and explanation thereof will not be repeated. Indicated by 20a, 20b and 20c are beam splitters, 21 is a converging lens, 22 is an object under test, 23 is a fine positioning mechanism coupled to the photodetector 8, and 24 and 25 are x-axis and y-axis fine movement command circuits which issue commands of displacement values in the x-axis and y-axis directions to the fine positioning mechanism 23.

The operation of this inventive heterodyne interferometer until the photodetector 8 produces the interference signal 9 is virtually identical to the conventional heterodyne interferometer explained on FIG. 7, except that only the frequency non-modulated beam the measurement point Q on the object 22 at a certain angle by being conducted by the converging lens 21. A reflected beam from the object is converged by the converging lens 21, conducted by the beam splitters 20b and 20c, and then entered together with the modulated beam 4 to the photodetector 8 which is being moved in a certain direction by the fine positioning mechanism 23.

When the photodetector 8 receives the two beams 3 and 4, it produces an interference signal 9 from the beams, as in the conventional interferometer. In this embodiment, the interference signal 9 to be supplied to the frequency analyzer 10 is also fed to the x-axis fine movement command circuit 24 and y-axis fine movement command circuit 25.

As explained previously, when the surface condition (roughness) of the object at the beam reflection point Q varies due to the movement or vibration of the object, the amount of the frequency non-modulated beam 3 incident to the entire sensitive plane of the photodetector 8 varies, causing the output level (integrity) of the interference signal 9 to vary. For dealing with this matter according to this embodiment, the x-axis fine movement command circuit 24 y-axis fine movement command circuit 25 detect the variation of the interference signal 9 with respect to the position of the photodetector 8 and issue commands of moving the photodetector 8 in the x and y directions (these directions refer to the plane perpendicular to the laser beam) so that the photodetector 8 receives the frequency non-modulated beam 3 at the position where the interference signal 9 has the highest level.

Figure 2:
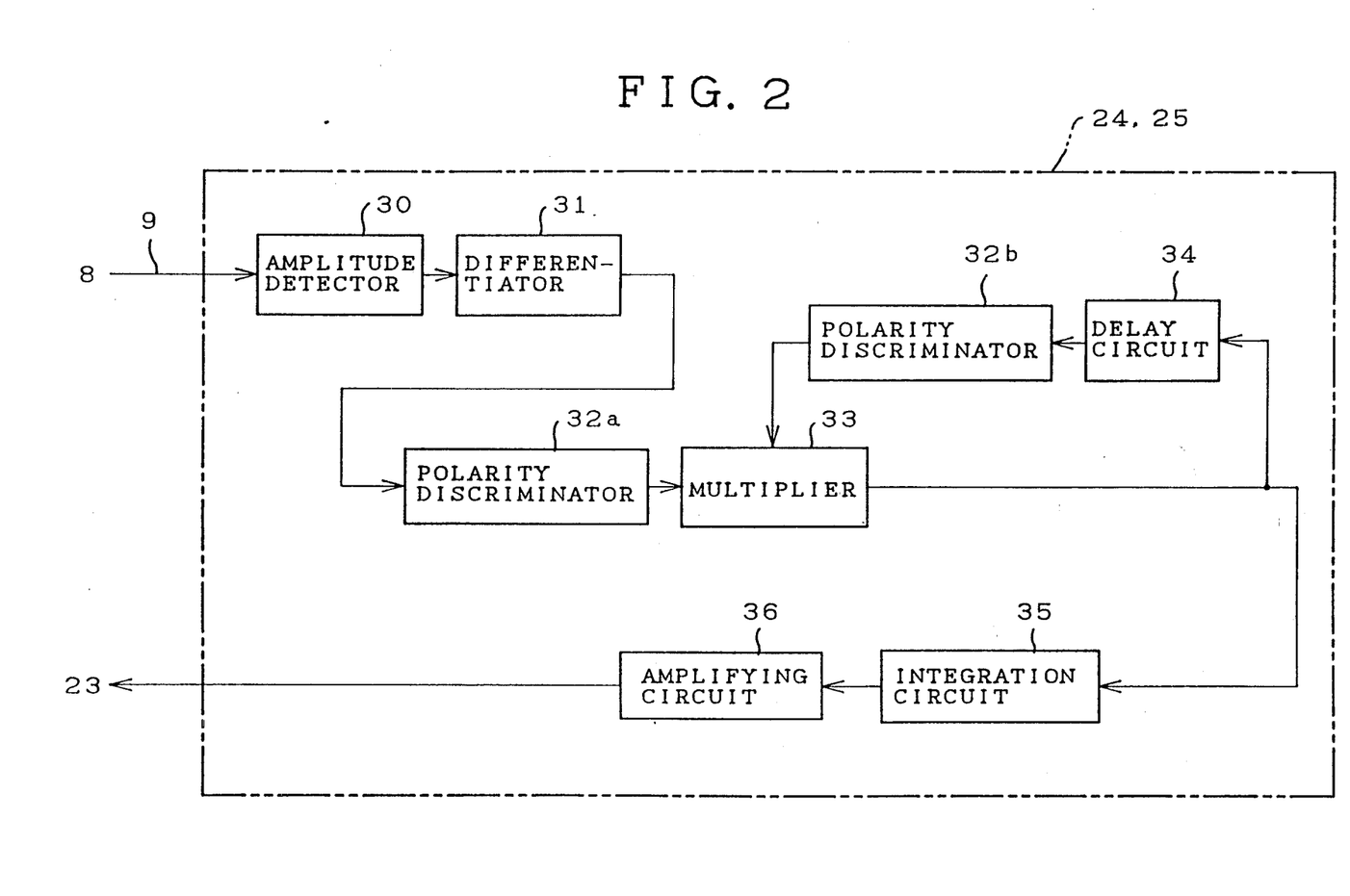
FIG. 2 is a block diagram showing the arrangement of the x-axis and y-axis fine movement command circuits in FIG. 1.
Figure 3:
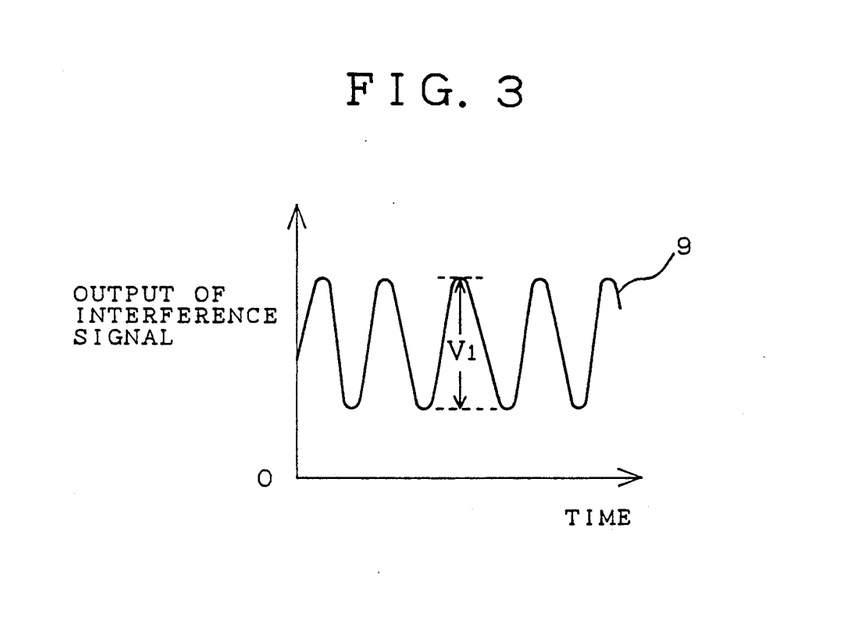
FIG. 3 is a graph showing the variation of the interference signal produced by the heterodyne interferometer shown in FIG. 1.
Figure 4:
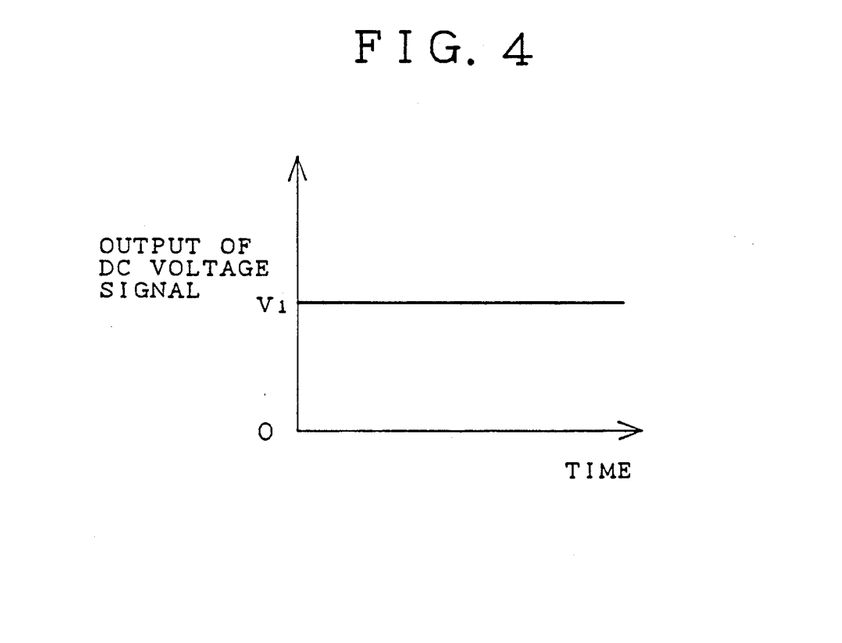
FIG. 4 is a graph showing the variation of the d.c. voltage signal which represents the amplitude of a.c. component of the interference signal shown in FIG. 3.

FIG. 2 shows the internal arrangement of the x-axis fine movement command circuit 24 and y-axis fine movement command circuit 25. Both circuits 24, 25 have the same arrangement. The interference signal 9 produced by the photodetector 8 is first fed to the amplitude detector 30. The amplitude detector 30 converts the amplitude of a.c. (alternating current) component of the interference signal 9 as shown in FIG. 3 (the amplitude is constant as shown by $V_1$ in this example) into a d.c. voltage signal as shown in FIG. 4. The d.c. (direct current) voltage signal is differentiated by a differentiator 31 so as to detect the gradient of the signal form at the moment of reception. The output of the differentiator 31 is fed to a polarity discriminator 32a, by which the polarity of gradient is revealed. The output of the differentiator 31 (gradient of the d.c. voltage signal) is fed through a multiplier 33 and fed to a polarity discriminator 32b by being delayed for a predetermined time length by means of a delay circuit 34. The polarity discriminator 32b reveals the polarity of gradient of the d.c. voltage signal after the delay time following the polarity discrimination made by the polarity discriminator 32a, and delivers the result to the multiplier 33.

The multiplier 33 implements multiplication for the outputs of the polarity discriminators 32a and 32b, while the photodetector 8 is being moved in certain directions of the x axis and y axis by the fine positioning mechanism 23.

Assuming that the polarity discriminator 32a reveals a positive gradient of the signal, the interference signal 9 will further increase if the fine positioning mechanism 23 continues to move the photodetect in the same direction. The delay circuit 34 delays the d.c. voltage signal, which has been subjected to the polarity discrimination, once for a predetermined time length and lets another polarity discriminator 32b discriminate the polarity of the gradient of the signal. If the photodetector 8 has not passed the position of the peak value of the interference signal 9 within the period of delay time, the outputs of the polarity discriminators 32a and 32b are both positive and the result of multiplication of the outputs is still positive. Otherwise, if the photodetector 8 has passed the peak position in the period of delay time, the output of the polarity discriminator turns to negative and the multiplier 33 produces a negative polarity output.

On this account, the fine positioning mechanism 23 continues to move the photodetector 8 in the same direction if the polarity of the multiplication result provided by the multiplier 33 remains positive. If the polarity of multiplication output turns to negative, the fine positioning mechanism 23 moves the photodetector 8 in the opposite direction. In case the polarity discriminator 32a initially reveals a negative gradient of the signal, the fine positioning mechanism 23 first operates in the opposite direction, and then is the procedure explained above is performed.

Each of the x-axis fine movement command circuit 24 and y-axis fine movement command circuit 25 includes an integration circuit 35, which integrates the output of the multiplier 33 as a velocity signal thereby to produce a position signal. The position signal is amplified to a predetermined level by an amplifying circuit 36, and the amplified position signal is delivered to the fine positioning mechanism 23. The fine positioning mechanism 23 moves the photodetector 8 along the x axis and y axis according to the position signals.

Accordingly, the heterodyne interferometer of this embodiment is capable of letting the photodetector 8 receive the frequency non-modulated beam 3 at the position where the level of the interference signal 9 is maximum.

The fine positioning mechanism 23 may be designed to operate in response to the velocity signal produced by the multiplier 33 instead of the position signal produced by the integrator 35, which can be eliminated in this case. Only one of the x-axis fine movement command circuit 24 and y-axis fine movement command circuit 25 may be used.

The photodetector 8 may be moved by means of a servo system which positions the photodetector through the detection of the a.c. amplitude of the interference signal 9 so that amplitude is maximum of using the x-axis fine movement command circuit 24 and y-axis fine movement command circuit 25 of the foregoing embodiment.

Although this embodiment is a reflection-type heterodyne interferometer and only the frequency non-modulated beam 3 is projected to the object under test to produce a reflection beam, it may be produced from the frequency modulated beam 4. Moreover, both beams may be subjected to the frequency modulation to provide a frequency difference. The arrangement of the foregoing embodiment can be applied to the heterodyne interferometer of transmission transmission type shown in FIG. 7.

Embodiment 2

Figure 5:
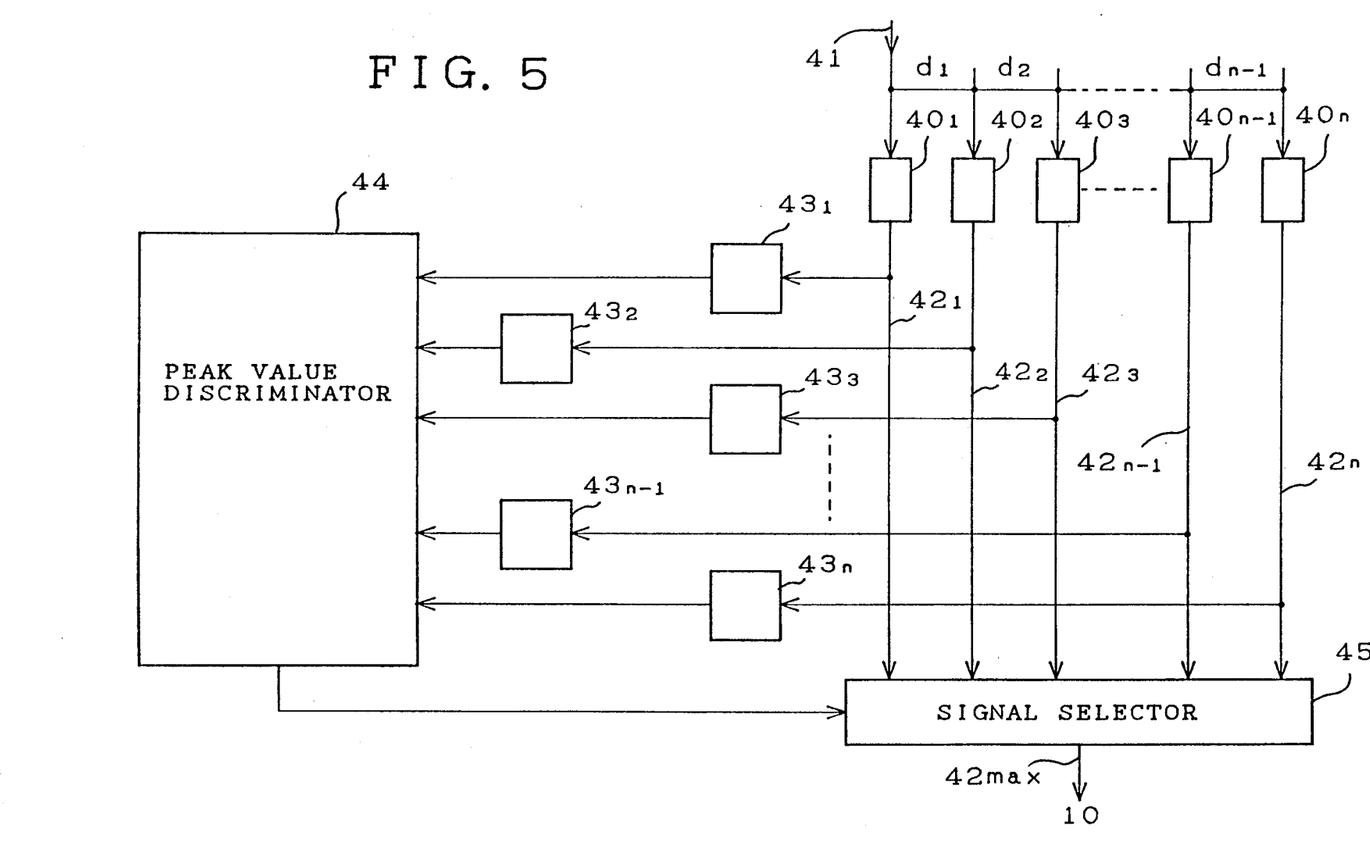
FIG. 5 is a block diagram of the circuit arrangement for obtaining the interference signal with the largest amplitude in the heterodyne interferometer based on another embodiment of this invention.

FIG. 5 shows the circuit arrangement for obtaining the interference signal at its highest level in the heterodyne interferometer based on the second embodiment of this invention. The remaining portions of this heterodyne interferometer are identical to those of the first embodiment.

Photodetectors of n in number $40_1, 40_2, \ldots, 40_n$ are disposed by being spaced by $d_1, d_2, \ldots, d_{n-1}$ on a plane perpendicular to the incident beam 41 (an intermixed beam of the reflection beam and non-reflection beam). The detectors $40_i (1 \leq i \leq n)$ produce interference signals $42_i$ from the incident beam 41, and these signals $42_i$ are fed to the corresponding amplitude detectors $43_1, 43_2, \ldots, 43_n$.

Each amplitude detector $43_i$ detects the amplitude of a.c. component of the interference signal, as explained for the first embodiment, and a resulting d.c. voltage signal which represents the amplitude is delivered to a peak value discriminator 44. The peak value discriminator 44 finds the detector which provides the interference signal of the highest level among the incoming signals, and imparts this detector $40_{max}$ (not shown) to a signal selector (multiplexer) 45 which receives the interference signals $42_i$. The multiplexer 45 selects the interference signal $42_{max}$ provided by the detector $40_{max}$ in accordance with the signal from the peak value discriminator 44, and supplies it to the frequency analyzer 10.

According to this embodiment, the interference signal with the highest level can be obtained without moving the photodetector.

Embodiment 3

Figure 6:
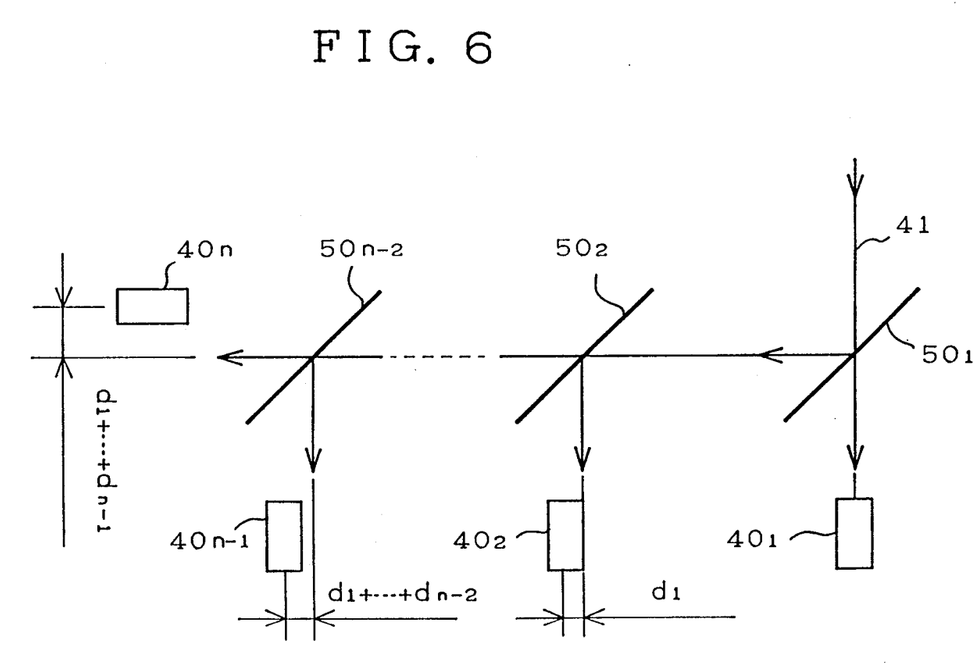
FIG. 6 is a diagram of the optical system for obtaining the interference signal with the largest amplitude in the heterodyne interferometer based on still another embodiment of this invention.

FIG. 6 shows the circuit arrangement for obtaining the interference signal at its highest level in the heterodyne interferometer based on the third embodiment of this invention. The remaining portions of this heterodyne interferometer are identical to those of the first and second embodiments.

Photodetectors of n in number $40_1, 40_2, \ldots, 40_n$ are separated by beam splitters of n-2 in number $50_1, 50_2, \ldots, 50_{n-2}$ which are disposed on the optical axis of the incident beam 41. The detectors $40_2, 40_3, \ldots, 40_n$ (all detectors excluding $40_1$) are disposed by being spaced by $d_1, d_1+d_2, \ldots, d_1+d_2+, \ldots, +d_{n-1}$, respectively, from the individual optical axes.

This embodiment achieves the same effectiveness as of the second embodiment, while allowing the relaxed disposition for the photodetectors.

The present invention is not confined to the foregoing embodiments. Instead, it will be obvious to those skilled in the art that various modifications are possible within the scope of the present invention as defined by the appended claims.

What is claimed is:

1. A heterodyne interferometer comprising:
   a laser oscillation means for producing a laser beam;
   a means for splitting the laser beam into two beams and causing the beams to have different frequencies;
   a heterodyne detection means which conducts the two laser beams so that at least one beam is reflected or transmitted by an object under test, and thereafter composes both beams and produces an interference signal from the composed laser beam by means of a photodetector included in it;
   a frequency analysis means which reveals the Doppler frequency component of the interference signal; and
   a photodetector positioning means which detects the amplitude of the component of the interference signal and positions the photodetector so that the amplitude is at a maximum.

2. The heterodyne interferometer of claim 1, wherein said means for splitting and causing the beams to have different frequencies comprises a beam splitter which splits the laser beam into said two beams and a frequency modulator disposed in a path of one of said beams to cause the two beams to have different frequencies.

3. The heterodyne interferometer of claim 1, wherein said photodetector positioning means comprises an amplitude detector which detects the amplitude of the alternating current component of the interference signal, a differentiator which differentiates an output signal from the amplitude detector, a polarity discrimination means which discriminates polarity of an output signal from the differentiator over a predetermined time, and a fine positioning mechanism for moving the photodetector towards a predetermined direction based on an output signal from the polarity discrimination means.

4. The heterodyne interferometer of claim 3, wherein said polarity discrimination means comprises a first polarity discriminator which discriminates polarity of the output signal from the differentiator, a multiplier which receives an output signal from the first polarity discriminator, a delay circuit which delays the output signal from the differentiator having passed the multiplier, and a second polarity discriminator which discriminates polarity of the output signal from the differentiator having passed the delay circuit, the multiplier multiplying the polarity discriminated by the first polarity discriminator and the polarity discriminated by the second polarity discriminator and outputting resultant polarity to the fine positioning mechanism as a velocity signal.

5. The heterodyne interferometer of claim 4, wherein said polarity discrimination means further comprises an integration circuit which integrates an output signal from the multiplier as a position signal and outputs the position signal to the fine positioning mechanism.

6. A heterodyne interferometer comprising:
a laser oscillation means for producing a laser beam;
a means for splitting the laser beam into two beams and causing the beams to have different frequencies;
a heterodyne detection means which conducts the two laser beams so that at least one beam is reflected or transmitted by an object under test, and thereafter composes both beams and produces interference signals from the composed laser beam by means of a plurality of photodetectors included in it and disposed in the direction perpendicular to the laser beam axis, and selects an interference signal having the largest amplitude of a.c. component among the signals provided by the photodetectors, and
a frequency analysis means which reveals the Doppler frequency component of the interference signal.

7. The heterodyne interferometer of claim 6, wherein said means for splitting and causing the beams to have different frequencies comprises a beam splitter which splits the laser beam into said two beams and a frequency modulator disposed in a path of one of said beams to cause the two beams to have different frequencies.

8. The heterodyne interferometer of claim 6, wherein said heterodyne means comprises an amplitude detection means which detects amplitude of an alternating current component of the interference signal, a peak value discrimination means which discriminates a peak amplitude from the amplitudes detected by the amplitude detection means, and a multiplexer means which discriminates interference signal having the largest amplitude and transmits this interference signal to the frequency analysis means.

* * * * *